United States Patent

[11] 3,565,202

| [72] | Inventors | Duane E. Evans;<br>Daniel C. Lenkaitis, Peoria, Ill. |
|---|---|---|
| [21] | Appl. No. | 785,671 |
| [22] | Filed | Dec. 20, 1968 |
| [45] | Patented | Feb. 23, 1971 |
| [73] | Assignee | Caterpillar Tractor Co.<br>Peoria, Ill. |

[54] CONTROL SYSTEM FOR ELECTRIC VEHICLE DRIVE
10 Claims, 3 Drawing Figs.

[52] U.S. Cl. .................................................. 180/65,
105/36, 290/17
[51] Int. Cl. .................................................. B60l 11/04
[50] Field of Search .................................. 180/65, 66
(A); 105/36, 35, 61.5; 290/2, 17, 21, 24, 25, 34, 35, 51, 40

[56] References Cited
UNITED STATES PATENTS

| 1,977,407 | 10/1934 | Schaer.......................... | 290/17 |
| 2,193,114 | 3/1940 | Seippel........................ | 290/2 |
| 2,336,232 | 12/1943 | Doran .......................... | 290/40X |
| 2,558,592 | 6/1951 | Starkey et al................. | 290/2 |
| 2,558,866 | 7/1951 | May et al...................... | 105/36X |
| 3,305,723 | 2/1967 | Maine et al................... | 290/40 |

Primary Examiner—Benjamin Hersh
Assistant Examiner—Milton L. Smith
Attorney—Fryer, Tjensvold, Felix, Phillips & Lempio ABSTRACT: To meet the special control problems arising in electric drive vehicle wherein a split shaft gas turbine engine drives a generator through its power turbine, a control system employs a closed loop to control the horsepower output of the engine proportional to a demand signal input and an independent, second closed loop to control the generator field excitation as a function of generator speed error.

INVENTORS
DUANE E. EVANS
DANIEL C. LENKAITIS 3,565,202

CONTROL SYSTEM FOR ELECTRIC VEHICLE DRIVE

BACKGROUND OF THE INVENTION

Gas turbine engine (GTE's) are now being considered as power plants for heavy-duty mobile equipment and electric drive systems between the GTE and the wheels and offer many advantages when GTE's are used, since expensive reduction gearing is eliminated. However, when using GTE's, with a separate power turbine providing the mechanical output, a number of problems are presented. Generally, such a GTE will change its horsepower as a function of ambient conditions, both at idle and at maximum horsepower. This characteristic will require a rather complex control system capable of continuously adjusting itself for the changes in ambient conditions.

Further, when the above GTE-electric drive arrangement is used in a work vehicle, such as a tractor, the loading or required horsepower from the GTE may vary sharply from one second to the next. Such variation will often result in an undesirable overspeed in the GTE unless it is quickly compensated by the control system.

In addition, the electric drive itself adds more parameters to the operating envelop of the GTE within which the control system operates the engine. For example, if one of the electric wheel motors stops, due to a stuck wheel, generator power output increases beyond safe limits, damaging both the windings of the generator and the stopped wheel motor. If a wheel slips, its electric drive motor can overspeed to the point where it will be damaged and the back electromotive voltage may increase sufficiently to cause st saturation of the generator field, with a turbine overspeed following as a result of the sharply reduced torque requirements.

SUMMARY OF THE INVENTION

In a drive system having a split shaft gas turbine powering a generator which supplies electrical power to drive motors, an improved control system includes a primary closed-loop circuit having as inputs a demand signal and a power signal proportional to actual generator output connected to fuel control circuit means of the gas turbine engine whereby fuel flow is adjusted as a function of generator output power error and a secondary closed-loop circuit, having as inputs actual generator speed and a selected bias, connected to the generator field excitation control whereby field excitation is controlled as a function of generator speed error independently of the primary closed-loop circuit.

Auxiliary closed-loop protective circuits can be connected in the primary closed-loop circuit to provide a signal calling for reduced fuel flow when unsafe conditions, such as gasifier overspeed, generator overspeed, drive motor overspeed and generator overcurrent are occurring.

BRIEF DESCRIPTION OF THE DRAWINGS

This invention will be more easily understood from the following detailed description of the preferred embodiment when taken in conjunction with the attached drawings wherein.

DESCRIPTION

Figure 1:
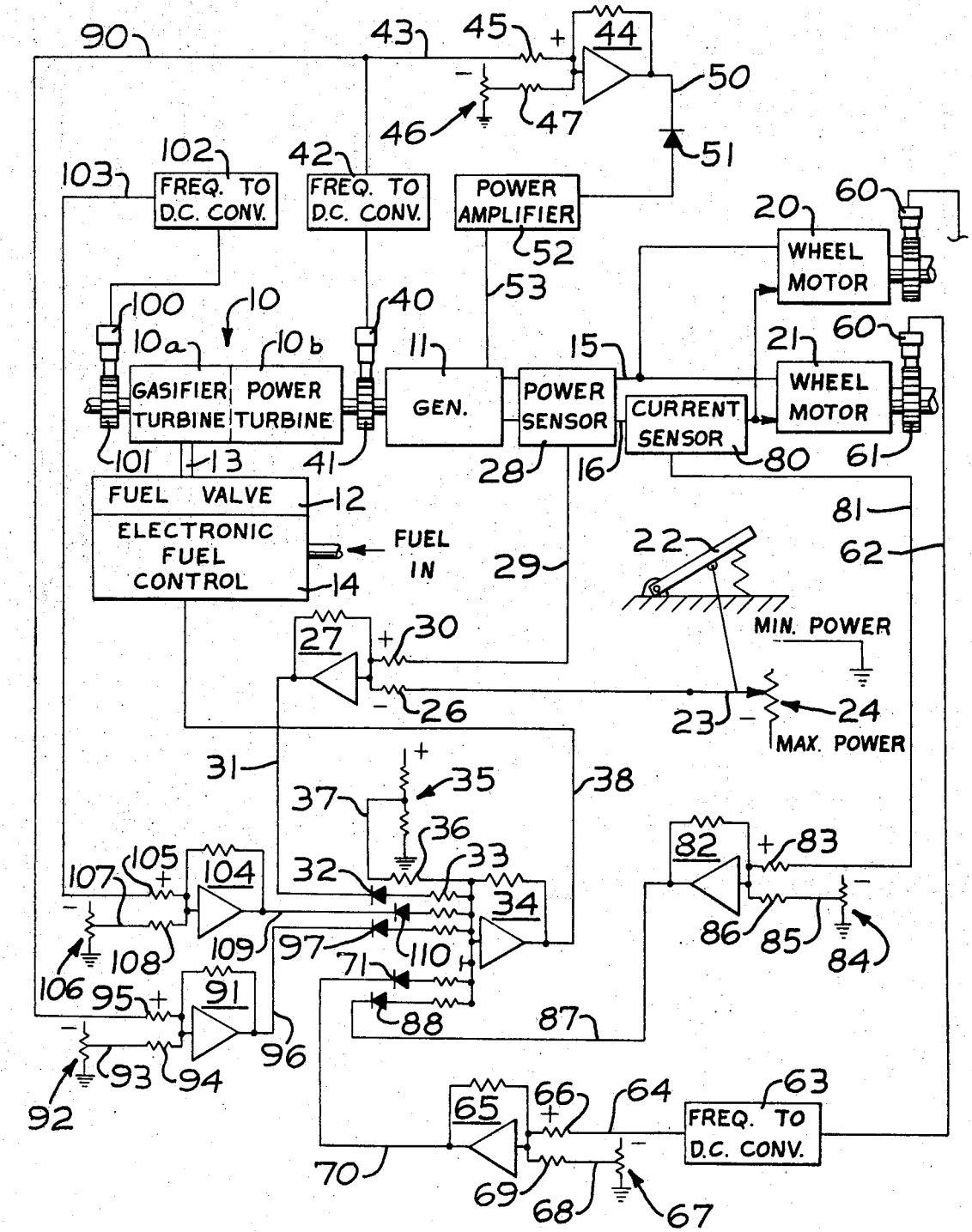
FIG. 1 illustrate a block diagram of an electric drive for a vehicle with an electrical schematic of the control system with protective circuits according to this invention.

Referring to FIG. 1, a gas turbine 10 is illustrated as a gas turbine with separate gasifier turbine 10a and power turbine 10b which is connected to generator 11. This generator is a conventional generator having capability for variable field excitation. The speed of the gasifier is controlled by means of a fuel control valve 12 incorporated in fuel supply line 13 and adjusted by an electronic fuel control system 14.

The electronic fuel control, which is a conventional, commercially available control, includes an acceleration limiter which prevents the fuel from exceeding a maximum safe flow until the speed of the gasifier has increased to accommodate it. Such a fuel control responds to electrical control signals from control circuits such as those disclosed herein. The generator, driven by the power turbine 10b, has its electrical output coupled, by means of leads 15 and 16, to two wheel motors 20 and 21 and, while only two motors are illustrated, obviously more wheel motors could be connected in this parallel network.

In the instant invention a power demand signal is determined by the operator positioning of throttle 22 which adjusts a slider 23 of potentiometer 24 which is biased with a suitable DC source, such as a battery with its positive side grounded. The position of the slider, as determined by the operator, will provide a signal to a summing junction 27 through a summing resistor 26 which is proportional to the selected power. This summing junction includes an operational amplifier with a feedback resistance so it will sum the signals representing the throttle setting and a signal representing the actual electrical power output of the generator 11.

Summing junction 27, which also can be considered a comparator, receives a second input from a power sensor 28 in the generator electrical power output leads through line 29 and summing resistor 30. Normally, the signal from the power sensor will be positive and, if the signal from the throttle is negative, the output of this summing junction will be zero when the electrical power sensor signal represents the power output called for by the throttle post position. The power sensor can be a wattmeter (e.g., a Hall effect device) that measures the actual instantaneous electrical power output and supplies an electrical signal proportional to this electrical power output to the summing junction.

An output signal from summing junction 27 via line 31 will pass through the diode 32, if negative, to a control summing junction 34 which controls the electronic fuel control 14. This control summing junction has a positive bias input from a voltage divider 35 through summing resistor 36 and lead 37. If no other signal is being received by the control summing junction the positive bias will cause the amplifier to have a negative output on lead 38 of a magnitude which will command the fuel control to go to maximum horsepower fuel flow.

As electrical power is sensed in the power sensor a plus signal will appear on lead 29. Assuming the throttle is at idle, this plus signal will pass through the high gain amplifier 27, be reversed in polarity and pass diode 32 where this negative signal will reduce the positive bias when these two signals are summed. As stated earlier, the generator 11 will have a small electrical output at idle which is consumed as electrical losses in the system and therefore will also cause a positive signal to be generated by the power sensor. With the proper magnitude of signals this arrangement will always adjust the fuel flow to the engine so the generator is always on the verge of producing more electrical power than necessary to take care of system losses under all ambient conditions.

Any time throttle 22 is depressed the positive signal of the power sensor will be summed with its negative signal, and until such time the power sensor develops a plus signal greater than the negative input from the throttle, diode 32 will block any signal to the control summing junction. Under these conditions, the signal to fuel control 14 will be commanding full fuel flow.

When the signal from the power sensor 28 exceeds the negative throttle input its signals will pass the diode 32 and be summed with that of the positive bias reducing the magnitude of the negative signal on lead 38 until equilibrium is reached. This arrangement causes generator electrical output and throttle position to be linear functions.

Obviously zener diodes could be employed in these circuits to achieve the same signal limiting characteristics.

In the above manner, the horsepower output of the gas turbine 10, is controlled by a closed loop system, which has as inputs, one representing the actual electrical power output of the generator and another representing the desired output (throttle position) which adjusts the electronic fuel control accordingly to obtain the proper horsepower output from the engine. It is apparent that no direct generator output control is provided in this closed loop and it is through a separate, secondary closed loop control circuit that the instant invention gains additional advantages. In the secondary closed loop, the generator output is controlled only relative to a generator speed error. This speed error is the difference between generator speed at idle and its actual speed above idle when the throttle has been advanced.

Actual generator speed in this loop is detected by a transducer 40, a magnetic pickup, which is located adjacent to a notched wheel 41 mounted on the generator shaft. The output of the magnetic pickup will be a waveform similar to an alternating current voltage, which is then converted to a direct current by a frequency-to-DC converter 42, so that a DC signal proportional to generator speed is obtained as an output on lead 43. Such a converter may take various forms and can employ diodes to develop a positive or negative signal as desired for control. The DC signal representing the speed of the generator is supplied to a summing junction 44 through a resistor 45.

Summed with the generator speed signal is a bias signal provided by a potentiometer 46 through summing resistor 47. This summing junction includes an operational amplifier with a feedback resistance and provides an output signal proportional to the actual speed of the generator summed with the bias voltage which represents generator speed at engine idle. This output signal is supplied by a line 50 through diode 51 to a power amplifier 52. In turn, the output of the power amplifier is connected directly to circuits in the generator to control its field excitation through line 53. The field excitation control unit (not shown) is conventional and is commercially available. The power amplifier is designed to control the excitation voltage of the generator in response to the speed error of the generator which is the difference between that set by the bias and that actually sensed by the transducer 40.

It should be appreciated that the power turbine, at engine idle, is driving the generator close to its rated r.p.m. and that a small amount of electrical power is being generated which is consumed as system electrical losses. Since the engine horsepower output varies with ambient conditions for a given gasifier turbine speed, the gasifier speed can be independently adjusted for ambient conditions, so at idle, the power turbine will be driving the generator close to its rated r.p.m. This follows since it takes the same horsepower to drive the generator at this speed regardless of ambient conditions, thus, the power turbine will always be running at the same speed when the engine is at idle.

If the engine horsepower output is then increased by increasing fuel flow to the gasifier, the power turbine will increase the speed of the generator causing the secondary closed loop to increase the field excitation because of the generator speed error whereby electrical power output of the generator will be proportioned to the speed error, i.e., the difference between the actual generator speed and idle generator speed.

This secondary closed loop, therefore, is dynamically responsive to the ability of the engine to drive the generator and will control the electrical power output of the generator within the engine's horsepower capabilities regardless of the electrical load on the generator. This gives many advantages in electric drives, which are powered by gas turbine engines.

As can be seen from the above description of the invention, the electrical output of the generator is directly proportional to its speed error and is controlled by a separate, independent closed loop system.

Thus, in operation where the throttle 22 generates a signal which will direct the electronic fuel control to increase the horsepower output of the gas turbine, an increased negative signal supplied by line 38 will command the electronic fuel control 14 to increase fuel flow to supply the demanded power but this increase in fuel flow will be limited by the electronic acceleration limiter (not shown) in the fuel control unit, which will prevent damage to the gas turbine. As fuel flow increases, power turbine speed will increase and consequently generator electrical power output will increase. The primary closed loop, controlling generator electrical output power, will continue to call for more power until the power sensor 28 begins to generate a positive signal which exceeds the negative signal generated by the throttle. At this time, summing junction 27 receives a positive signal and supplies a negative signal on line 31. This negative signal passes diode 32 and reduces the positive bias on control summing junction 34. This in turn will decrease the negative output voltage level on lead 38 so that the electronic fuel control will decrease fuel flow to the gas turbine.

It should also be appreciated that this system never instantaneously unloads the gas turbine, when a decrease in electrical power output is required. Any requirement for decrease in electrical power output is reflected back through the control circuitry to decrease the fuel flow to the gas turbine and as fuel flow decreases, so will horsepower output. It decreases and thus the generator electrical power output decreases subsequently.

While the above description covers the primary and secondary circuits in the control, it does not provide for any protective circuits, which may be necessary when overspeeds occur in the engine, unusual high currents occur in the circuitry, or wheel slip occurs.

In order to prevent damage to the electric drive motors caused by wheel slip, each wheel is provided with a speed transducer 60, which in the instant illustration, is a magnetic pickup cooperating with a toothed wheel 61 driven by the wheel motor. Each wheel includes such a transducer and a signal from the transducer via line 62 is coupled to a frequency-to-DC converter 63 which generates a DC output which is connected by a lead 64 to summing junction 65 through a summing resistor 66. A second input to this summing junction is from a biasing potentiometer 67 via line 68 through resistor 69 and until the positive DC voltage from the frequency-to-DC converter exceeds the negative bias voltage, the signal from the summing junction via line 70 will not pass a blocking diode 71 to the control summing junction 34. Normally, the signal from the frequency-to-DC converter will be positive and, therefore, when it exceeds the bias signal will pass the diode, because the operation amplifier will reverse its polarity, and cause the control summing junction to command the electronic fuel control to reduce the speed of the gas turbine by decreasing the positive bias.

Obviously, every wheel motor in the drive system can be provided with a similar closed loop circuit and similarly connected to the control summing junction 34 to protect each of the wheel motors.

As illustrated in the drawings, the wheel motors are connected in parallel and, therefore, it is possible to employ a current sensor 80 to correct the situation when any wheel becomes stuck which would endanger both the generator windings and those of the wheel motor which is stuck. This current sensor which may take various forms, such as shunt resistor, provides a signal via line 81 which is proportional to current flow from the generator. This signal is added in summing junction 82 via resistor 83 with a negative bias voltage from potentiometer 84 through line 85 and summing resistor 86. In the illustrated embodiment, the signal from the current sensor is positive and the negative bias is set so that the positive signal from the current sensor will not exceed the negative bias until after the maximum permissible current is flowing through the circuit. Under such circumstances, the operational amplifier in the summing circuit which includes a negative feedback, will provide a negative signal via line 87 through blocking diode 88 to the control summing junction 34 which will reduce the positive bias on the summing junction and, therefore, call for a decrease in the rate of fuel flow to the gasifier turbine. As fuel flow to the gasifier turbine decreases, power turbine speed decreases and the generator electrical power output will be reduced via the independent closed loop control which controls its field excitation relative to speed error. In this manner, both the generator and the wheel motors are protected, both when a wheel motor overspeeds or a wheel motor is stopped due to a stuck wheel.

Further closed loop protective circuits can be provided in the instant control system to prevent damage which may occur in the gas turbine itself. In the drawings, a circuit for preventing power turbine overspeed is provided by taking the signal from the frequency-to-DC converter 42 via line 90 to summing junction 91 which is biased by potentiometer 92 through line 93 and summing resistor 94. If the signal on lead 90 through its summing resistor 95 exceeds the negative bias provided by the potentiometer, the operational amplifier with a resistive feedback circuit develops a negative signal on its output lead 96 which passes the blocking diode 97 to the control summing junction 34 and will reduce the positive bias thereby calling for a decrease in fuel flow to the gasifier turbine, as previously described. Similarly, the gasifier turbine can be monitored by a separate transducer 100, which is a magnetic pickup cooperating with a toothed wheel 101 driven by the gasifier turbine. The output from this magnetic pickup is provided to a frequency-to-DC converter 102 which provides a DC output signal via line 103 to summing junction 104 via a summing resistor 105. Like the other summing junctions, this one has an input from a biasing potentiometer 106 via lead 107 and summing resistor 108. The bias on the summing junction is set for maximum allowable gasifier speed, and any time the signal on line 103 becomes more positive than the bias, the operational amplifier with the resistive feedback will provide a negative signal on lead 109 which will pass the blocking diode 110 to the control summing junction 34 and reduce the positive bias, calling for a decrease in fuel flow to the gasifier turbine.

Beyond the protective circuits, the basic control circuit can be further modified either to provide a fast response or maximum efficiency as desired, which is accomplished by changing the bias provided via potentiometer 46 to summing junction 44.

Figure 2:
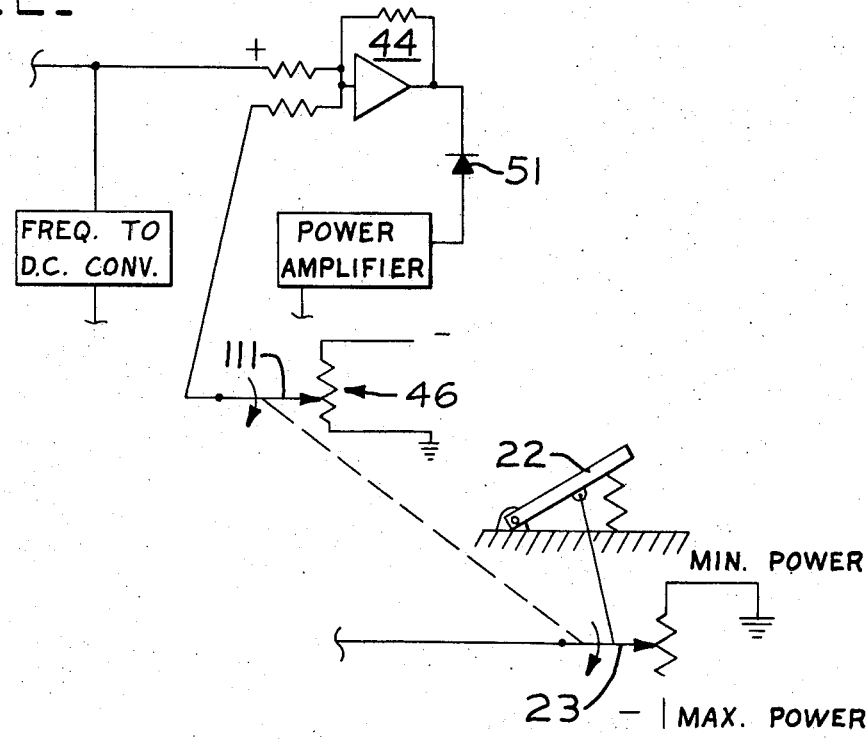
FIG. 2 is a partial schematic of a circuit which can be employed in the basic invention for improving the response of the electric drive circuit, through control circuit modification.

In FIG. 2, the system for fast response is illustrated and requires the wiper 23 controlled by the throttle 22 be ganged with the wiper 111 of potentiometer 46 so that when the throttle is depressed, the negative bias on the summing junction 44 will be decreased. When this occurs, part of the inertia in the system will be converted to generator output power since this summing junction will indicate a more negative signal than normal which will pass blocking diode 51 to the power amplifier which will increase the generator field excitation. Obviously, since this system converts some of the kinetic energy stored in the system to electrical output power, it cannot be repeated in quick succession, since it is necessary for the system to buildup speed before it is employed a second time.

Figure 3:
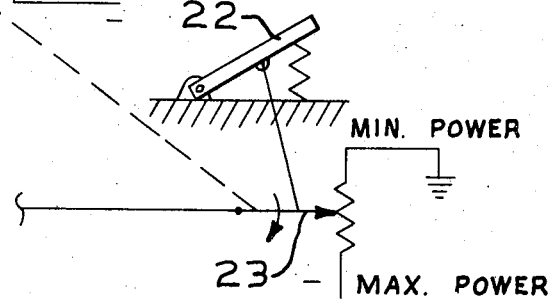
FIG. 3 is a partial schematic diagram of a circuit for obtaining maximum efficiency from the power turbine portion of the prime mover through control circuit modification.

In FIG. 3, the system for maximum efficiency is illustrated, and, again, the wiper 111 of potentiometer 46 is ganged with the wiper 23 of the throttle 22. However, in this case, instead of reducing the negative bias as the throttle is depressed, it actually increases the negative bias which has a tendency to lower the torque requirements on the power turbine in order for it to accelerate. In such a system, the response time is increased but the efficiency is greatly increased since the generator power output and the turbine speed increases on the best curves.

In the drawings, all the summing junctions are illustrated as operational amplifiers with feedback resistances and include biasing potentiometers whereby the desired level can be adjusted. This arrangement can provide both proportional and integral action. However, simple summing junctions can be substituted for the more complex ones illustrated in the drawings. Such a substitution, of course, would eliminate the ability to control the gain of the individual circuit and the ability to insert integral action in the circuits. However, it will reduce the cost of the control. In addition, in order to affect the cost saving, some of the more complex summing junctions shown could be replaced with simplified junctions with the more complex junctions, used only in the more important control areas, such as for the generator field excitation and control summing junctions.

Obviously, there are other biasing arrangements which can be employed to achieve the results described and those shown are primarily for illustration.

We claim:

1. In a drive system with a gas turbine having a gasifier turbine and a separate power turbine driving a generator with a controllable field for providing electrical power for cyclic electrical loads, a control system comprising:
   a generator speed sensor means producing a speed signal proportional to actual generator speed;
   generator field control means having an independent closed loop system coupled to receive as inputs said speed signal from said generator speed sensor and a bias representing a selected speed input, said independent loop operable to control said controllable field solely as a function of generator speed;
   a demand signal generating device operable to produce a demand signal representing desired electrical power;
   a generator electrical power output sensor connected in the generator electrical power output circuits producing an output signal proportional to actual electrical power output;
   summing means connected to receive said demand signal and said output signal and operable to produce a difference signal representing their difference;
   a control unit connected to receive said difference signal and connected to the fuel control unit of said gas turbine engine whereby the rate of fuel flow is controlled as a function of said difference signal.

2. The control system as described in claim 1 wherein the fuel control unit includes an acceleration limiting device.

3. The control system as described in claim 1 wherein the drive system is a vehicle drive wherein the generator powers electric motors driving wheels of said vehicle.

4. The control system as described in claim 3 wherein each electrical motor driving a driving wheel of the vehicle has a speed sensing transducer associated therewith in a protective circuit, said protective circuit connected to said summing means and operable to send a signal thereto when a wheel motor overspeeds.

5. The control system as defined in claim 4 wherein a current sensor means is included in the connection between the generator and of the electric motors driving a driving wheel of the vehicle, said current sensor connected in a protective circuit coupled to the control unit and operable to send a signal to reduce the rate of fuel flow any time the maximum permissible current is exceeded.

6. The control system as defined in claim 1 wherein the summing means receiving the demand signal and the output signal includes a high gain amplifier and its connection to the control unit includes a blocking diode which will pass a difference signal only when the said output signal is of larger magnitude than said demand signal and said control unit includes a bias of opposite polarity than a signal which will pass the diode whereby the bias will cause a maximum fuel signal until a signal passes through said diode.

7. The control system as described in claim 6 wherein the gasifier turbine has a speed transducer means associated therewith, said speed transducing means connected in a protective circuit coupled to the control unit to produce a signal to reduce the rate of fuel flow when said gasifier turbine overspeeds.

8. The control circuit as described in claim 1 wherein the demand signal generating device is coupled to the generator field control means and operable to change its selected speed input bias when said demand signal generating device is manipulated.

9. The control system as described in claim 8 wherein manipulation of the demand signal generating means to increase the demand signal decreases the bias on the generator field control means and allows some of the inertia in the generator drive to provide fast generator electrical output response.

10. The device as described in claim 8 wherein manipulation of said demand signal generating device to increase the demand signal increases the bias in the generator field control means thereby causing the generator electrical output to increase to the selected power output on the most efficient curves.